UNITED STATES PATENT OFFICE.

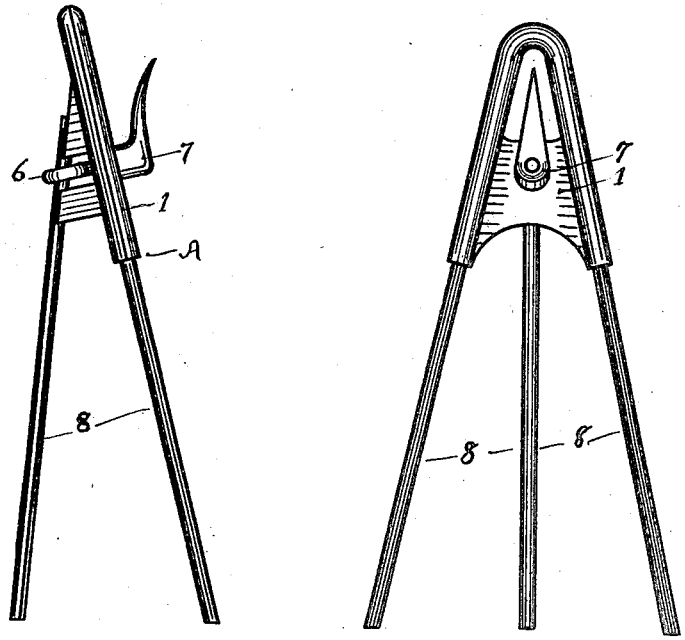

CHARLES SMITH, OF PROVIDENCE, RHODE ISLAND.

EASEL FOR FLORISTS' USE.

1,407,490.　　　　　Specification of Letters Patent.　　Patented Feb. 21, 1922.

Application filed September 15, 1921. Serial No. 500,935.

*To all whom it may concern:*

Be it known that I, CHARLES SMITH, a citizen of the United States, residing at Providence, in the county of Providence and State of Rhode Island, have invented a new and useful Easel for Florists' Use, of which the following is a specification.

Prior to my invention hereinafter described easels on which to hang floral pieces for display had been known and used by florists. Such easels were constructed of wire and being non-adjustable were usable only for the display of a corresponding sized floral piece. This necessitated the carrying in stock of an easel for each sized floral piece, thereby adding greatly to the overhead of the floral business, and requiring increased storage room.

The purposes of my invention are to provide a convenient and inexpensive easel for florists' use which can be readily and quickly adjusted to properly support and display floral pieces of different sizes, and which can further be adjusted, in emergency, to permit the easel to stand on inclined or uneven surfaces, and can be quickly disassembled when not in use, and will therefore occupy little space.

To these ends my invention consists in the new and useful construction, combination and arrangement of parts hereinafter described and illustrated in the accompanying drawings, in which, Figure 1 is a front elevation of my newly invented easel.

Figure 2 is a side elevation of the same.

Figure 3 shows a sectional and an end view of the front member of the easel head.

Figure 4 shows similar views of the rear member of the easel head.

Figure 5 is a side elevation of the rear member of the easel head.

Figure 6 shows one of the easel supporting legs.

Figure 7 is a plan view of the screw-eye which forms a part of the means for clamping the several parts of the easel together.

Figure 8 is a side elevation of the hook nut which supportingly holds a floral piece, and also in conjunction with the screw-eye clamps the several parts of the easel together.

Figure 9 is a side elevation showing leg of the easel in its adjusted position to permit the easel to stand on an inclined surface, the easel head being shown partly broken away.

Like reference numerals and letters indicate like parts where they occur in the several views.

Referring to the drawings; A represents my newly invented easel head composed of two separable members, supporting legs held by such members, means for rigidly clamping said members and legs together in easel form, and other means for holdingly supporting a floral or other piece for display.

1 represents the front head member which is provided on its inner face with oppositely disposed angularly directed grooves $1^1$, $1^1$, and with a perforation $1^2$ located between said grooves, 2 represents the rear head member which is similarly provided on its inner face with oppositely disposed angularly directed grooves $2^1$, $2^1$, and also on its outer face with horizontally extending bosses $2^3$, $2^4$, oppositely disposed in alinement with each other with their outer ends beveled or cut away so that they terminate in a plane angularly inclined to the plane of the member 2 (Fig. 5). Said bosses are each provided in their end faces with a groove arranged and adapted to receive one of the easel legs. Said member 2 is further provided with a perforation $2^5$ located between said bosses. A screw-eye 6 arranged and adapted to engagingly receive the rear leg of the easel and provided with a threaded end arranged and adapted to pass through the perforations $1^2$, $2^5$, of the respective head members and be engaged by the nut 7 whereby said head members and easel legs are rigidly clamped together (Figs. 1 and 2). Said nut 7 is provided with a hook portion for holdingly supporting a floral or other piece.

The length of the easel legs can readily be adjusted by sliding them a greater or lesser distance along the grooves of the head members. And by sliding one leg farther than the others the easel can be fitted to stand on an inclined or uneven surface, as shown in Fig. 9. The easel legs 8 are preferably made of wire, but any form of leg may be used provided the grooves in the head members are shaped to accommodate the form of leg used. The configuration of the head members may be changed provided the grooves and their angular relation to each other are maintained.

To assemble the parts the two head members are brought together with the grooves registering with each other, the front legs placed in the grooves, and rear leg placed in the grooves in the extensions of the rear member of the head and passed through the eye of the screw-eye, and the threaded end of the latter passed through the perforation in the front and rear members of the head. The nut is then screwed onto the threaded end of the screw-eye thereby drawing the head members together and rigidly clamping them and the legs together. The grooves in the front head members register each with the corresponding opposite grooves in the rear head member when the members are clamped together by the nut, and at the same time the perforations in the said members similarly register with each other. Disengaging the nut from the screw-eye and withdrawing the latter from the perforations in the head members permits the easel to be disassembled and put in compact form occupying little space.

Although I have described by invention as particularly adapted for florists' use it will be understood that it is not so limited in scope, as it is obviously equally adapted for any use to which an easel may be put.

I claim as my invention and desire to secure by Letters Patent:

1. An easel comprising a head composed of two separable members each member provided on its interior face with grooves disposed in opposite converging planes, and with a perforation located between said grooves, said grooves and perforations, in each member registering with the corresponding grooves and perforation in the other member when the two members are joined, one of said members also provided on its exterior face with lateral extensions of differing height, the outer end of each extension grooved and cut away at an angle to the plane of said member, said grooves in said members and extensions arranged and adapted to receive supporting legs, all in combination with each other and with supporting legs and means for clamping said head members and supporting legs firmly together.

2. In an easel a head composed of two separable members each member provided on its interior face with oppositely disposed converging grooves and with a perforation located between said grooves, said grooves and perforations in each member registering with the corresponding grooves and perforations in the other member when the two members are joined all combined with each other and with supporting legs engaged by said members and with means for clamping said members and supporting legs firmly together.

3. In an easel the combination of a head composed of two separable members each having on its inner face oppositely disposed grooves located in converging planes the grooves in one member registering with those in the other member when the two members are joined together, one of said members having on its exterior face horizontally extending bosses alined with each other and having their ends grooved and terminating in a plane angularly inclined to the plane of said head face, supporting legs held in the grooves in said head members and said bosses, a screw-eye alined with said bosses and arranged to engagingly receive one of said supporting legs, and provided with a threaded shank extending through said head members, and a nut engaging said threaded shank to thereby rigidly clamp said head members and supporting legs together, and provided with a hook extension arranged and adapted to serve as a support for a floral piece or other article.

4. In an easel the combination of a head composed of two separable members, each member having on its inner face oppositely disposed grooves located in converging planes, and one of said head members further having lateral grooved extensions on its outer face, legs held in said grooves in said head members and in said grooved extensions, a screw-eye having a shank extending through said head members and a nut engaging the free end of said screw-eye shank whereby said head members and easel legs are rigidly clamped together.

CHARLES SMITH.